US012279555B2

United States Patent
Becker et al.

(10) Patent No.: US 12,279,555 B2
(45) Date of Patent: Apr. 22, 2025

(54) TARGET FOR GRAIN TANK LEVEL SENSOR INTEGRATED INTO THE GRAIN TANK

(71) Applicant: CNH Industrial America LLC, New Holland, PA (US)

(72) Inventors: Justin Becker, Elizabethtown, PA (US); Mark D. Dilts, New Holland, PA (US); Michael Minnich, Elizabethtown, PA (US); Clayton E. Banks, Jr., Brownstown, PA (US); Denver R. Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 713 days.

(21) Appl. No.: 17/467,952

(22) Filed: Sep. 7, 2021

(65) Prior Publication Data

US 2023/0071349 A1 Mar. 9, 2023

(51) Int. Cl.
*A01D 41/127* (2006.01)
*G01F 23/296* (2022.01)

(52) U.S. Cl.
CPC ....... *A01D 41/1275* (2013.01); *G01F 23/296* (2013.01)

(58) Field of Classification Search
CPC .............. A01D 41/1275; G01F 23/296; G01F 23/2962; G01F 23/804
See application file for complete search history.

(56) References Cited

U.S. PATENT DOCUMENTS

| 2016/0286723 A1* | 10/2016 | Banks, Jr. .......... A01D 41/1208 |
| 2017/0208742 A1 | 7/2017 | Ingibergsson et al. |
| 2019/0082596 A1 | 3/2019 | Becker et al. |
| 2019/0166761 A1* | 6/2019 | Conrad .............. A01D 41/1275 |
| 2019/0204135 A1 | 7/2019 | Lee et al. |

FOREIGN PATENT DOCUMENTS

| CN | 2901258 Y | 5/2007 |
| CN | 109041757 A | 12/2018 |

OTHER PUBLICATIONS

Extended European Search Report for EP Application No. 22194198.2 dated Jan. 30, 2023 (six pages).

* cited by examiner

*Primary Examiner* — Grant Moubry
*Assistant Examiner* — Ruben Picon-Feliciano
(74) *Attorney, Agent, or Firm* — Peter K. Zacharias (57) ABSTRACT

An embodiment includes a system for sensing harvested grain levels within an agricultural harvester. The system including a grain tank configured to receive harvested grain, a sensor configured to emit a sensor beam into the grain tank for reflection off of the top surface of the harvested grain, and a reflective target integrated into a bottom surface of the grain tank at a minimum detectable grain level within the grain tank. The bottom surface of the grain tank being angled towards the sensor, the minimum detectable grain level being defined by a minimum grain level within the grain tank at which the top surface of the harvested grain is contacted by the sensor beam, and the reflective target being configured to reflect the sensor beam when the current grain level is vertically below the minimum detectable grain level.

20 Claims, 11 Drawing Sheets

TARGET FOR GRAIN TANK LEVEL SENSOR INTEGRATED INTO THE GRAIN TANK

FIELD OF THE INVENTION

The invention relates to a target for grain tank level sensor integrated into the grain tank.

BACKGROUND OF THE INVENTION

Many agricultural harvesters include a sensor configured to sense harvested grains levels within the grain tank. For example, the sensor may be configured to emit a sensor beam, such as an ultrasonic beam, into the grain tank for reflection off of a top surface of the harvested grain stored within the grain tank. The sensor may also be configured to receive the sensor beam after reflection off of the harvested grain. In this regard, a time period between when the sensor beam is emitted by the sensor and when the reflected sensor beam is received by the sensor may be indicative of the harvested grain level within the grain tank.

In certain instances, when the current grain level within the grain tank is below a certain vertical position (e.g., the grain tank is mostly empty), the geometry of the grain tank may prevent the sensor beam from contacting the top surface of the harvested grain. In such instances, a reflective target may be positioned within the grain tank so as to reflect the sensor beam when the harvested grain is unable to do so. However, conventional reflective targets must be mounted within the grain tank at a precise orientation to reflect the sensor beam in a direction that the sensor is able to receive. Such a precise mounting orientation requires the use of time-consuming alignment and adjustment procedures during installation of the reflective target. When the reflective target is not mounted in such a precise orientation, the sensor beam is reflected in such a manner that the sensor is unable to receive the reflected sensor beam.

SUMMARY OF THE INVENTION

An embodiment includes system for sensing harvested grain levels within an agricultural harvester. The system including a grain tank extending vertically between a top end and a bottom end, the grain tank being configured to receive harvested grain, a current grain level of the harvested grain being defined by a top surface of the harvested grain within the grain tank, a sensor configured to emit a sensor beam into the grain tank for reflection off of the top surface of the harvested grain, and a reflective target integrated into a bottom surface of the grain tank at a minimum detectable grain level within the grain tank, the bottom surface of the grain tank being angled towards the sensor, the minimum detectable grain level being defined by a minimum grain level within the grain tank at which the top surface of the harvested grain is contacted by the sensor beam, and the reflective target being configured to reflect the sensor beam when the current grain level is vertically below the minimum detectable grain level.

Another embodiment includes an agricultural harvester having a harvesting implement, a threshing and separating assembly configured to thresh and separate the harvested grain provided by the harvesting implement, a grain tank extending vertically between a top end and a bottom end, the grain tank being configured to receive the harvested grain from the threshing and separating assembly, a sensor configured to emit a sensor beam into the grain tank for reflection off of a top surface of the harvested grain, a current grain level being defined by the top surface of the harvested grain within the grain tank, and a reflective target integrated into a bottom surface of the grain tank at a minimum detectable grain level within the grain tank. The bottom surface of the grain tank being angled towards the sensor, the minimum detectable grain level being defined by a minimum grain level within the grain tank at which the top surface of the harvested grain is contacted by the sensor beam, and the reflective target being configured to reflect the sensor beam when the current grain level is vertically below the minimum detectable grain level.

Another embodiment includes a method for sensing harvested grain levels within an agricultural harvester having a grain tank extending vertically between a top end and a bottom end, a sensor, and a reflective target integrated into a bottom surface of the grain tank at a minimum detectable grain level within the grain tank, the bottom surface of the grain tank being angled towards the sensor. The method includes emitting, by the sensor, a sensor beam into the grain tank towards the reflective target integrated into the bottom surface of the grain tank, reflecting, by the reflective target integrated into the bottom surface of the grain tank, the sensor beam when the current grain level is vertically below the minimum detectable grain level, and receiving, by the sensor, the reflected sensor beam.

DETAILED DESCRIPTION

Reference now will be made in detail to embodiments of the invention, one or more examples of which are illustrated in the drawings. Each example is provided by way of explanation of the invention, not limitation of the invention.

It will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for sensing harvested grain levels within an agricultural harvester (e.g. combine). Specifically, in several embodiments, the system may include a grain tank of the combine that is configured to receive harvested grains. In general, a current grain level within the grain tank may be defined by a top surface of the harvested grains within the grain tank. The system may also include a sensor configured to emit a sensor beam into the grain tank for reflection off of the top surface of the harvested grains. The sensor may also be configured to receive the reflected sensor beam, which may be indicative of the current grain level within the grain tank.

Furthermore, the system may include a reflective target positioned at a minimum detectable grain level within the grain tank, with the minimum detectable grain level being defined by a minimum grain level within the grain tank at which the top surface of the harvested grain is contacted by the sensor beam. As such, the reflective target may be configured to reflect the sensor beam when the current grain level is vertically below the minimum detectable grain level. The reflective target may have a flat shape, or may have a three dimensional shape such as a convex shape, where the center of the reflective target may be positioned closer to the sensor than an outer edge of the reflective target such that the reflective target diffuses the sensor beam as it reflects off of the reflective target. When the reflective target has convex shape, the diffused sensor beam may be dispersed over a greater area than sensor beams reflected off of conventional reflective targets. In this regard, the sensor may be able to receive the diffused sensor beam as reflected off of the reflective target despite a variety of orientations relative to the sensor. Specifically, the dispersed nature of the diffused sensor beam may permit the sensor to receive at least a portion of the diffused sensor beam when the sensor is mounted in each of the variety of orientations. Accordingly, it is not necessary to have a precise orientation between the sensor and the reflective target. Further details of a reflective target having a three dimensional shape such as a convex shape are found in U.S. Pat. No. 10,368,488 which is incorporated by reference herein in its entirety and for all purposes.

The terms "grain" and "residue" are used principally throughout this specification for convenience but it is to be understood that these terms are not intended to be limiting. "Grain" refers to that part of the grain material which is threshed and separated from the discardable part of the grain material, which is referred to as non-grain grain material, material other than grain (MOG). "Residue" refers to MOG that is to be discarded from the combine. Also the terms "fore", "aft", "left," and "right", when used in connection with the agricultural harvester (e.g. combine) and/or components thereof are usually determined with reference to the direction of forward operative travel of the combine, but again, they should not be construed as limiting.

Figure 1A:
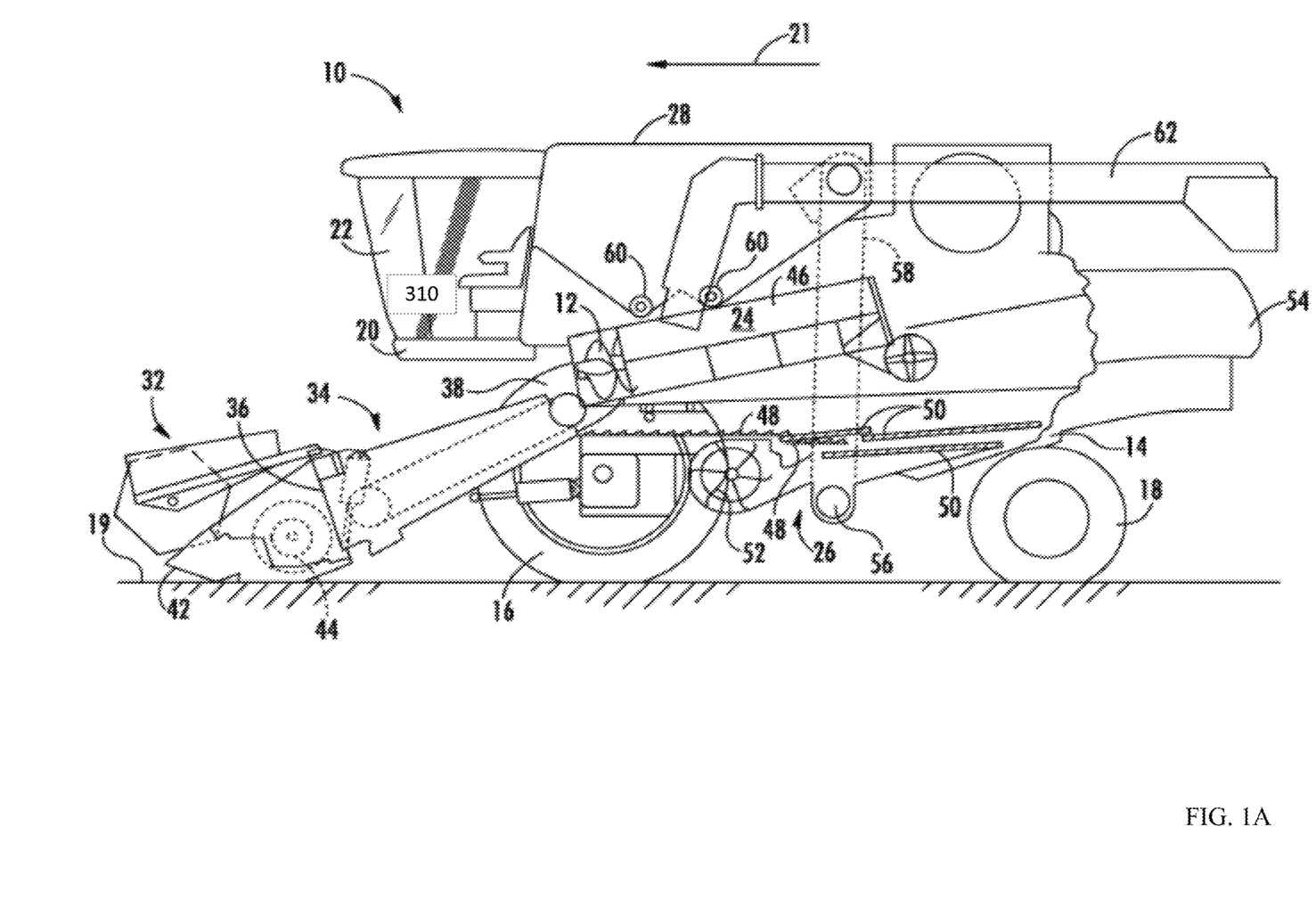
FIG. 1A is a side view of a combine, according to an embodiment of the invention.

Referring now to the drawings, and more particularly to FIG. 1A, there is shown one embodiment of an agricultural harvester combine 10, which generally includes a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1A, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the combine 10 to allow the front end 36 of the feeder 34 and, thus, the header 32 to be moved upwardly and downwardly relative to the ground 19 to set the desired harvesting or cutting height for the header 32.

As the combine 10 is propelled forwardly over a field with standing grain, the grain material is severed from the stubble by a sickle bar 42 at the front of the header 32 and delivered by a header auger 44 to the front end 36 of the feeder 34, which supplies the harvested grain to the threshing and separating assembly 24. As is generally understood, the threshing and separating assembly 24 may include a cylindrical chamber 46 in which the rotor 12 is rotated to thresh and separate the harvested grain received therein. That is, the harvested grain is rubbed and beaten between the rotor 12 and the inner surfaces of the chamber 46, whereby the grain, seed, or the like, is loosened and separated from the MOG.

The harvested grain which has been separated by the threshing and separating assembly 24 falls onto a series of pans 48 and associated sieves 50, with the separated harvested grain being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the harvested grain. For instance, the fan 52 may blow the impurities off of the harvested grain for discharge from the combine 10 through the outlet of a straw hood 54 positioned at the back end of the combine 10.

The cleaned harvested grain passing through the sieves 50 may then fall into a trough of an auger 56, which may be configured to transfer the harvested grain to an elevator 58 for delivery to the associated grain tank 28. Additionally, in one embodiment, a pair of tank augers 60 at the bottom of the grain tank 28 may be used to urge the cleaned harvested grain sideways to an unloading tube 62 for discharge from the combine 10.

A combine controller 310 is also included in the combine. The combine controller may be a programmable logic controller, micro-controller, etc. The combine controller is programmable by the operator of the combine through a user (e.g. operator) interface, or through a remote computer (not shown). The operator, for example, enters commands through the user interface. In response to these commands, the controller sends control signals to the various actuators of combine 10. More details of combine controller 310 are described with reference to FIG. 3.

It should be appreciated that the configuration of the combine 10 described above and shown in FIG. 1A is provided only to place the present subject matter in an exemplary field of use. Thus, it should be appreciated that the present subject matter may be readily adaptable to any manner of combine configuration.

Figure 1B:
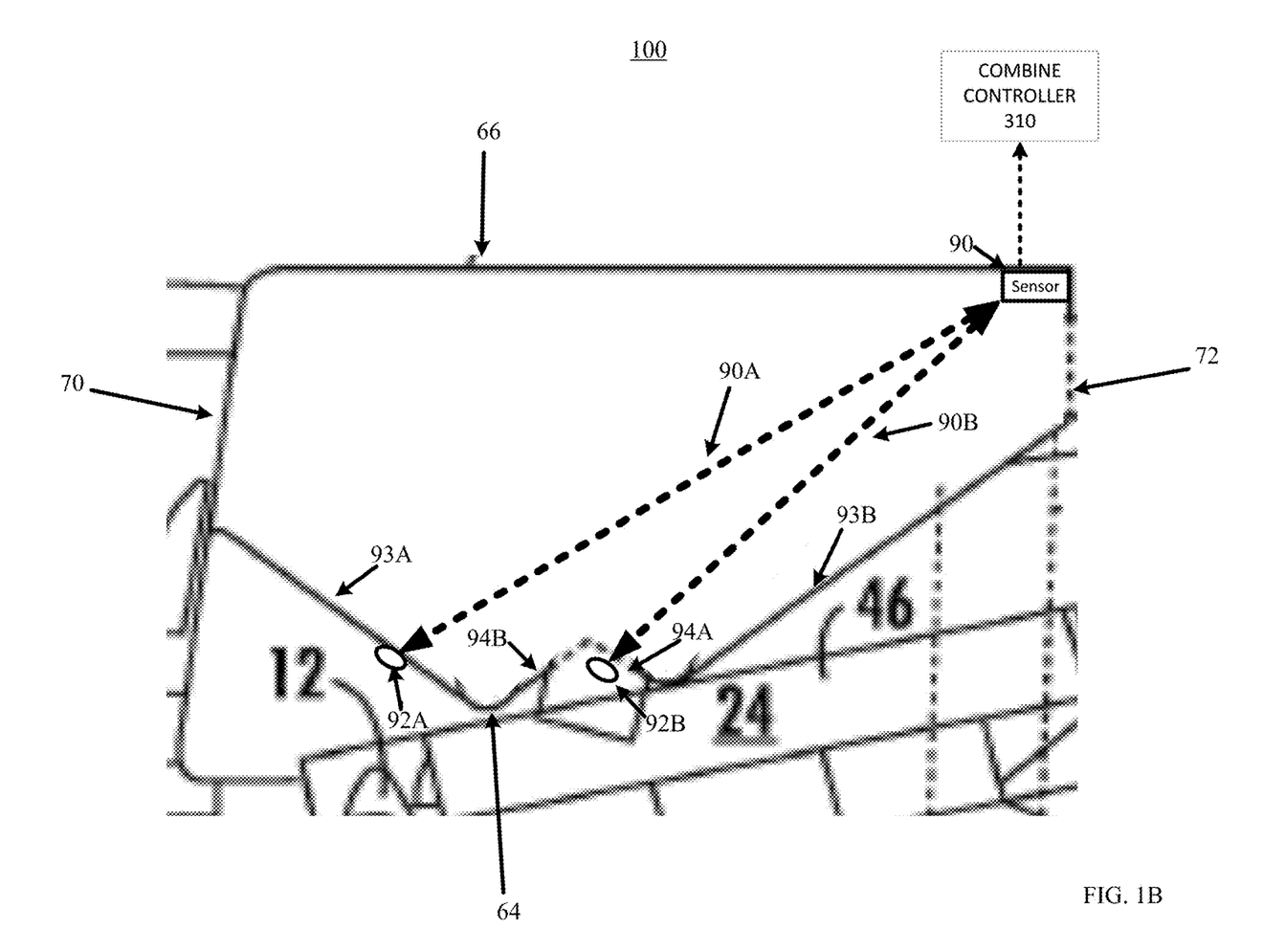
FIG. 1B is a section view of a combine grain collection system showing an example reflective target placement, according to an embodiment of the disclosure.

Referring now to FIG. 1B, a schematic side view of a system 100 for sensing harvested grain levels within an agricultural harvester, the system includes the grain tank, combine controller, sensor and reflective targets for sensing harvested grain levels within combine 10 in accordance with aspects of the present subject matter. As shown in FIG. 1B, the grain tank 28 of the combine 10 may extend in a vertical direction between a bottom end 64 and a top end 66. The grain tank 28 may also extend in a longitudinal direction between a forward end 70 and an aft end 72, with the forward end 70 being positioned in front of the aft end 72 relative to the forward direction of travel of the combine 10. In addition, the bottom surface of grain tank 28 may include one or more walls, such as floor panels 93A/93B and auger covers 94A/94B positioned at the bottom end 64 of tank 28, and a side walls extending vertically upward from floor panel 93 to the top end 66 of the tank 28. In one embodiment, the top end 66 of the grain tank 28 may be open. Furthermore, the walls may define a grain tank 28 in which harvested grain is stored. However, it should be appreciated that, in alternative embodiments, the grain tank 28 may have any suitable configuration.

In accordance with aspects of the present subject matter, the system 100 may include a sensor 90 configured to emit one or more sensor beams and receive one or more sensor return beams (e.g., as indicated by arrows 90A/90B in FIG. 1B) into the grain tank 28 of the grain tank 28 depending on the position of the reflective target. For example, when targeting reflective target 92A, line 90A in FIGS. 1A and 1B represents the path of an emitted beam and a reflected return beam, whereas when targeting reflective target 92B, line 90B in FIGS. 1A and 1B represents the path of an emitted beam and a reflected return beam. In general, the sensor beam(s) 90A/90B is configured to be reflected off of a top surface of the harvested grain (not shown) stored in the grain tank 28. Furthermore, the sensor 90 may further be configured to receive the reflected sensor beam(s) 90A/90B. As shown in FIG. 1B, in one embodiment, the sensor 90 may be coupled to the top edge of the side wall of the grain tank 28, such as at a location at or proximate to the aft end 72 of the grain tank 28. However, it should be appreciated that the sensor 90 may be mounted and/or positioned at any other suitable location in which the sensor 90 may emit the sensor beam(s) 90A/90B into the grain tank 28. For example, FIG. 1C a schematic side view of a system 102 for sensing harvested grain levels within an agricultural harvester, the system in this embodiment shows that the sensor 90 may be coupled to the top edge of the side wall of the grain tank 28, such as at a location at or proximate to the forward end 70 of the grain tank 28.

Additionally, it should be appreciated that the sensor 102 may generally correspond to any suitable sensing device suitable configured to function as described herein, such as by emitting one or more sensor beams into the grain tank 28 for reflection off of the top surface of the harvested grain and by receiving or sensing the reflected sensor beams. For example, in one embodiment, the sensor 90 may correspond to an ultrasonic sensor(s) configured to emit one or more ultrasonic beams for reflection off of the top surface of the harvested grain.

Controller 310 may be configured to determine or monitor the current grain level within the grain tank 28 based on the sensor data received from the sensor. Specifically, controller 310 may be communicatively coupled to the sensor 90 via a wired or wireless connection to allow measurement signals to be transmitted from the sensor 90 to the controller. For example, in one embodiment, the measurement signals may be indicative of a time duration defined between when the sensor beam 90A/90B is emitted by the sensor 90 and the reflected sensor beam is received by the sensor 90. As such, the controller 310 may then be configured determine the current grain level based on the measurement signals received from the sensor 90. For instance, the controller 310 may include a look-up table or suitable mathematical formula stored within its memory that correlates the sensor measurements to the current grain level of the harvested grain.

In general, the minimum detectable grain level may be defined by a minimum grain level within the grain tank 28 at which the top surface of the harvested grain is contacted by the emitted sensor beam(s). For example, in some embodiments, the geometry of the grain tank 28 may prevent the emitted sensor beam(s) from contacting the top surface of the harvested grain when the top surface of the harvested grain is positioned vertically below the minimum detectable grain level. When the current grain level of the harvested grain within the grain tank 28 is below a minimum detectable grain level, the system relies a reflective target 92A/92B to reflect the sensor beam.

Figure 1C:
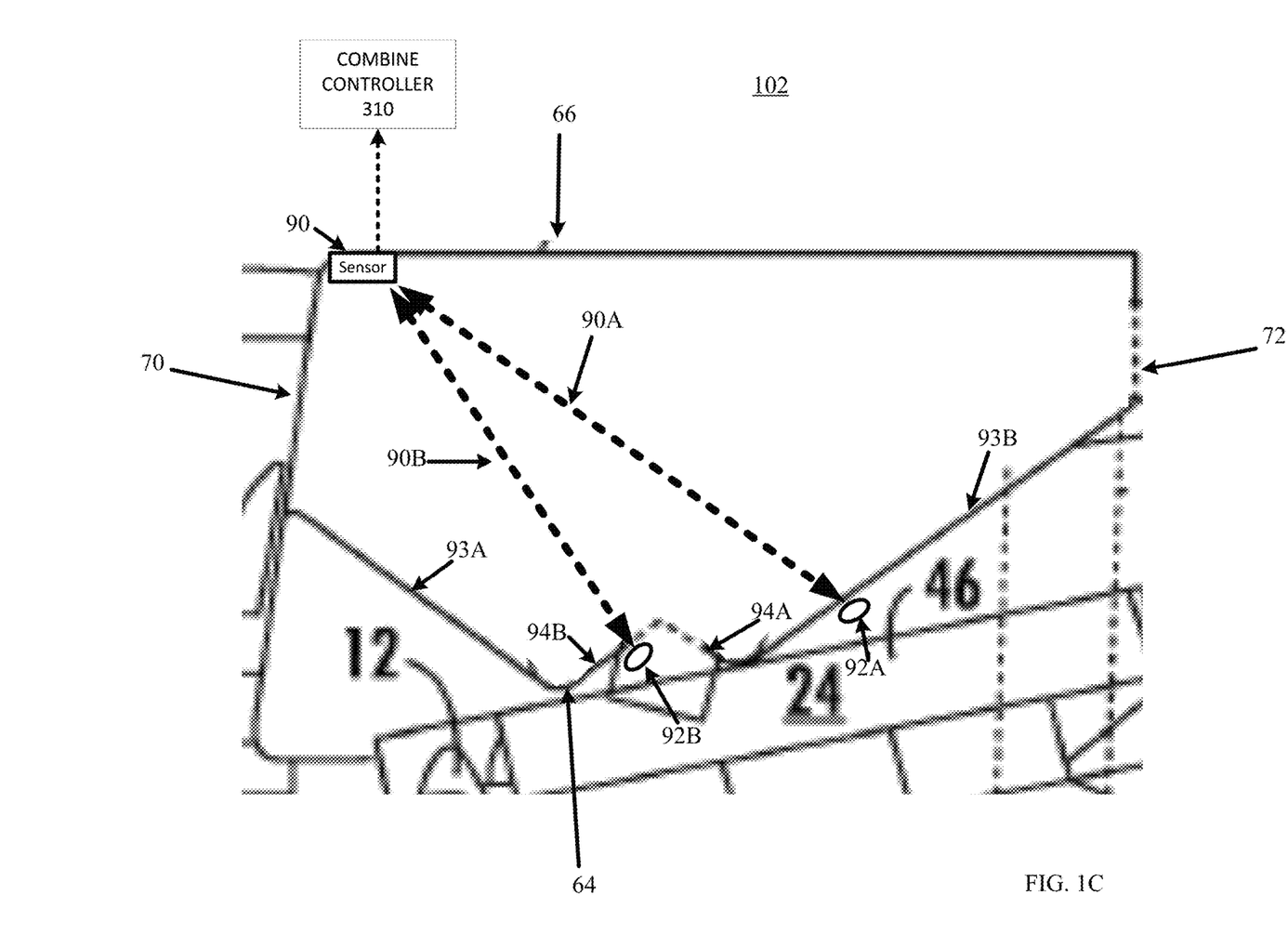
FIG. 1C is another section view of a combine grain collection system showing an example reflective target placement, according to an embodiment of the disclosure.

For example, as shown in FIGS. 1B/1C, the combine may include a reflective target(s) 92A/92B positioned at the minimum detectable grain level within the grain tank 28. Specifically, reflective target(s) 92A/92B may be configured to reflect and diffuse the one or more emitted sensor beams 104 as one or more diffused sensor beams when the current grain level is positioned vertically below the minimum detectable grain level. As shown, in FIG. 1B, when the sensor 90 is mounted to the aft end of the grain tank, the reflective target(s) 92A/92B are positioned on a surface(s) that is angled towards the aft end of the grain tank (e.g. angled towards the sensor). These surfaces may include but are not limited to grain tank floor panel 93A and grain tank auger cover 94A. In contrast, as shown in FIG. 1C, when the sensor 90 is mounted to the forward end of the grain tank, the reflective target(s) 92A/92B are positioned on a surface(s) that is angled towards the forward end of the grain tank (e.g. angled towards the sensor). These surfaces may include but are not limited to grain tank floor panel 93B and grain tank auger cover 94B. It should be appreciated that reflective target(s) 92A/92B may be positioned at any suitable location within the grain tank 28 such that the reflective target(s) 92A/92B may reflect the emitted sensor beam(s) when the current grain level is below the minimum detectable grain level. A reflection from one of the reflective target(s) 92A/92B indicates to the controller that the grain tank is closer to empty that it is to full.

Figure 2A:
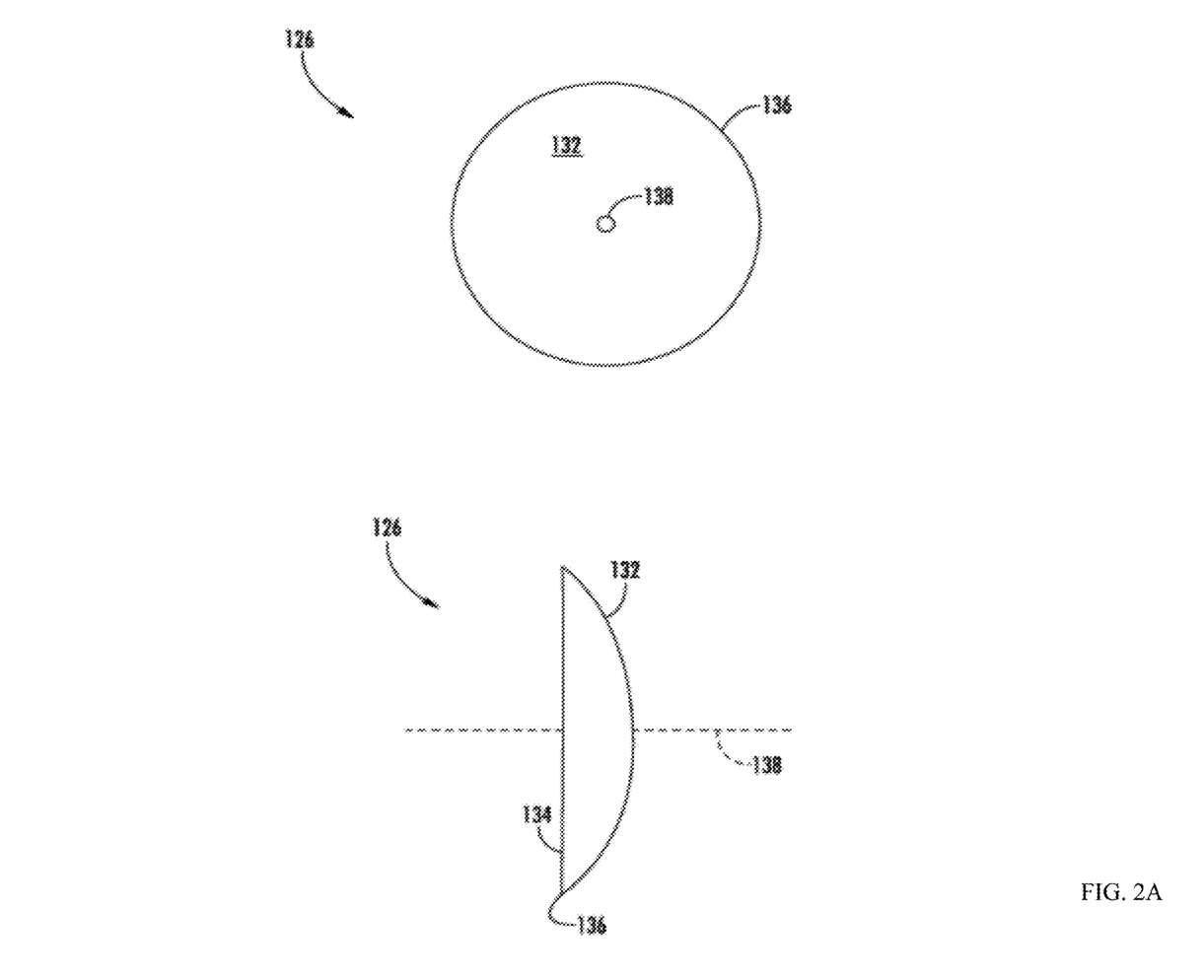
FIG. 2A is a front view and a side view of a convex reflective target.

Referring now to FIG. 2A, convex reflective target 126 may include reflecting surface 132 configured to reflect the emitted sensor beam(s) 90A/90B and an opposed, non-reflecting surface 134. Additionally, the reflective target 126 may include an outer or peripheral edge 136 positioned outward from a center as indicated by dot 138. As such, the reflecting and non-reflecting surfaces 132/134 may intersect at the outer edge 136. Although the outer edge 136 is illustrated in FIG. 2A as defining a circular shape, it should be appreciated that the outer edge 136 may define any suitable shape, such as a rectangular shape. Furthermore, in one embodiment, the center 138 of the reflecting surface 132 may be configured to be positioned closer to the sensor 102 than the outer edge 136 of the reflecting surface 132 such that the emitted sensor beam(s) 104 may be diffused upon reflection off of the reflecting surface 132 to form the diffused sensor beam(s) 128. In this regard, as shown in the illustrated embodiment, the reflective target 126 may define a convex shape. However, it should be appreciated that the reflective target 126 may have any suitable shape and/or configuration such that the center 138 of the reflecting surface 132 is positioned closer to the sensor 90 than the outer edge 136 of the reflecting surface 132 so as to diffuse the emitted sensor beam(s) 90A/90B.

Figure 2B:
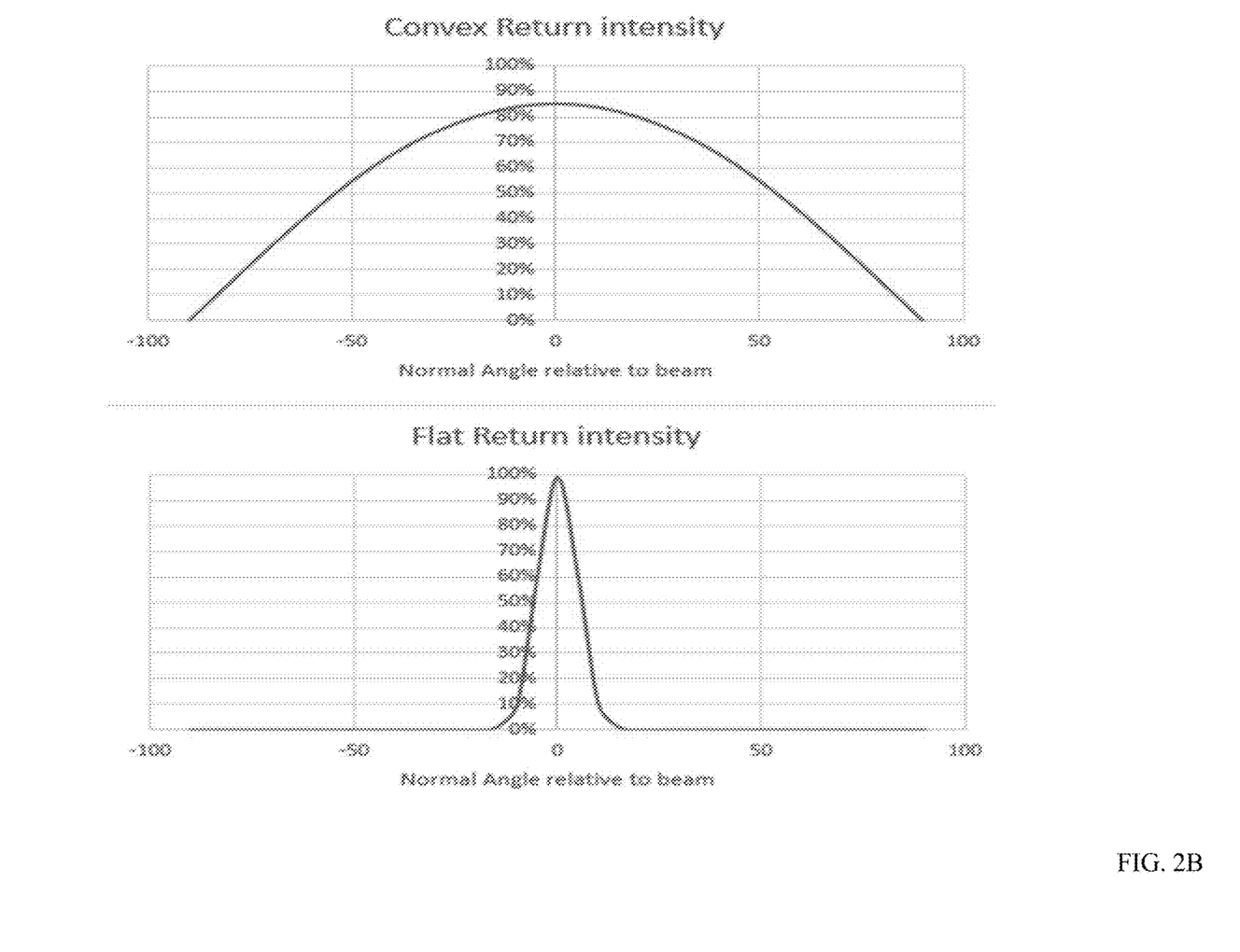
FIG. 2B is a graph of the intensity return comparison between a convex target and a flat target.

This convex shaped reflective target produces a wider return intensity distribution as compared to a flat shaped reflective target. A comparison between the return intensity distributions of a convex shaped reflective target and a flat convex shaped reflective target is illustrated in FIG. 2B which shows the relationship between beam axis and the target normal. For the convex target, there is lower at peak return, but a higher average return spread over a larger angle. Thus, the convex target less dependent upon the alignment of the sensor with the target, as opposed to the flat target which requires more precise alignment of the sensor with the target so that the reflected return beam will be incident on sensor.

As indicated above, the sensor 90 may be configured to emit the sensor beam(s) 90A/90B into the grain tank 28 for reflection off of the top surface of the harvested grain. However, when the top surface of the harvested grain within the grain tank 28 is positioned vertically below the minimum detectable grain level, the top surface of the harvested grain may be unable to reflect the emitted sensor beam(s) 90A/90B. In such instances, the reflective target 126 may be configured to reflect the emitted sensor beam(s) 90A/90B for reception by the sensor 90. Specifically, the reflective target 126 may be configured to diffuse and reflect the beam(s) 90A/90B such that the reflected, diffused sensor beam(s) are dispersed over a greater area than the reflected sensor beam(s). Accordingly, due to the dispersal of the diffused sensor beam(s), the reflective target 126 may be positioned in a variety of different orientations relative to the sensor 90 while still allowing the sensor 90 to receive or detect the diffused sensor beam(s).

Figure 2C:
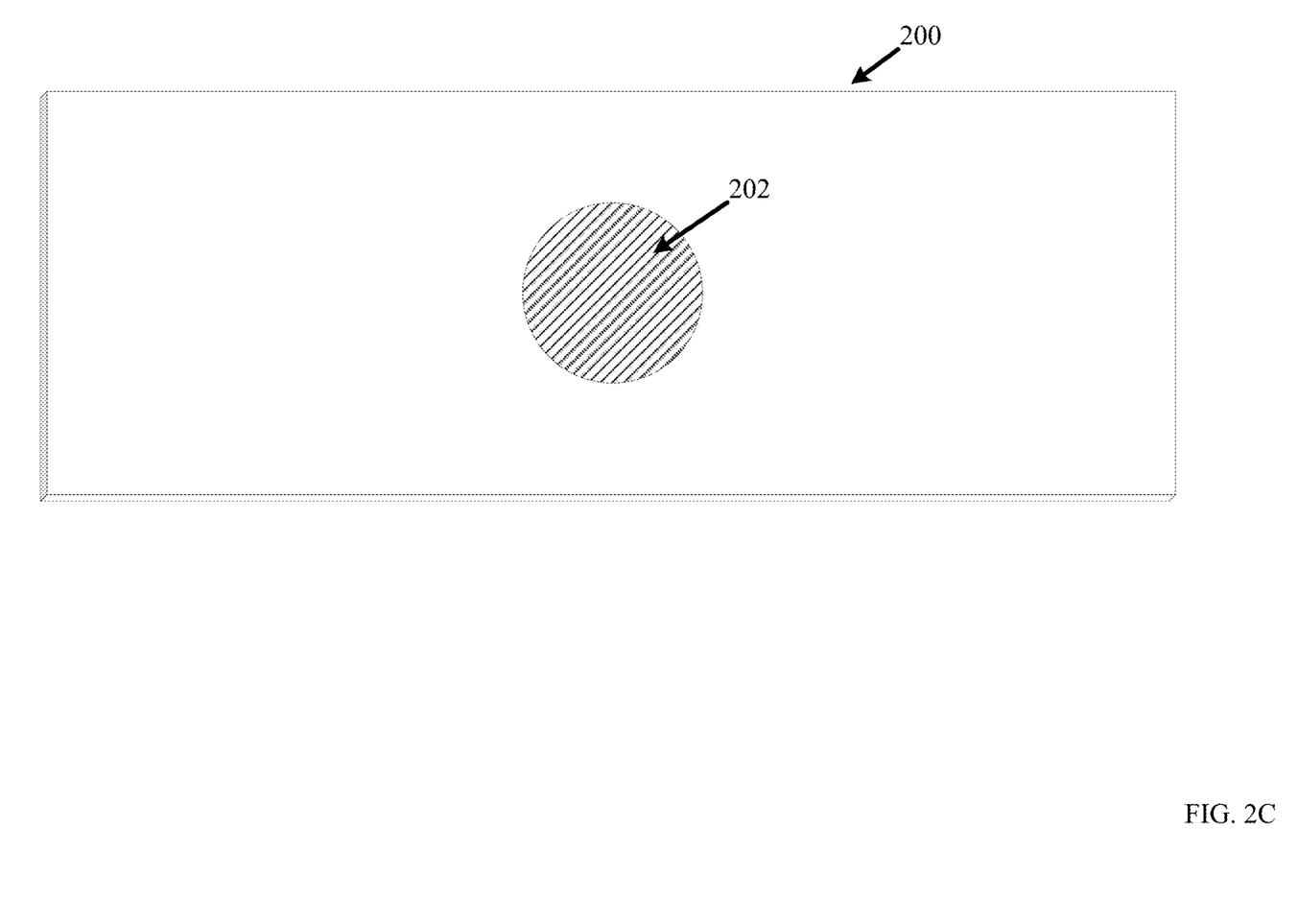
FIG. 2C is a perspective view of the convex reflective target stamped into a panel of the combine grain tank, according to an embodiment of the disclosure.
Figure 2D:
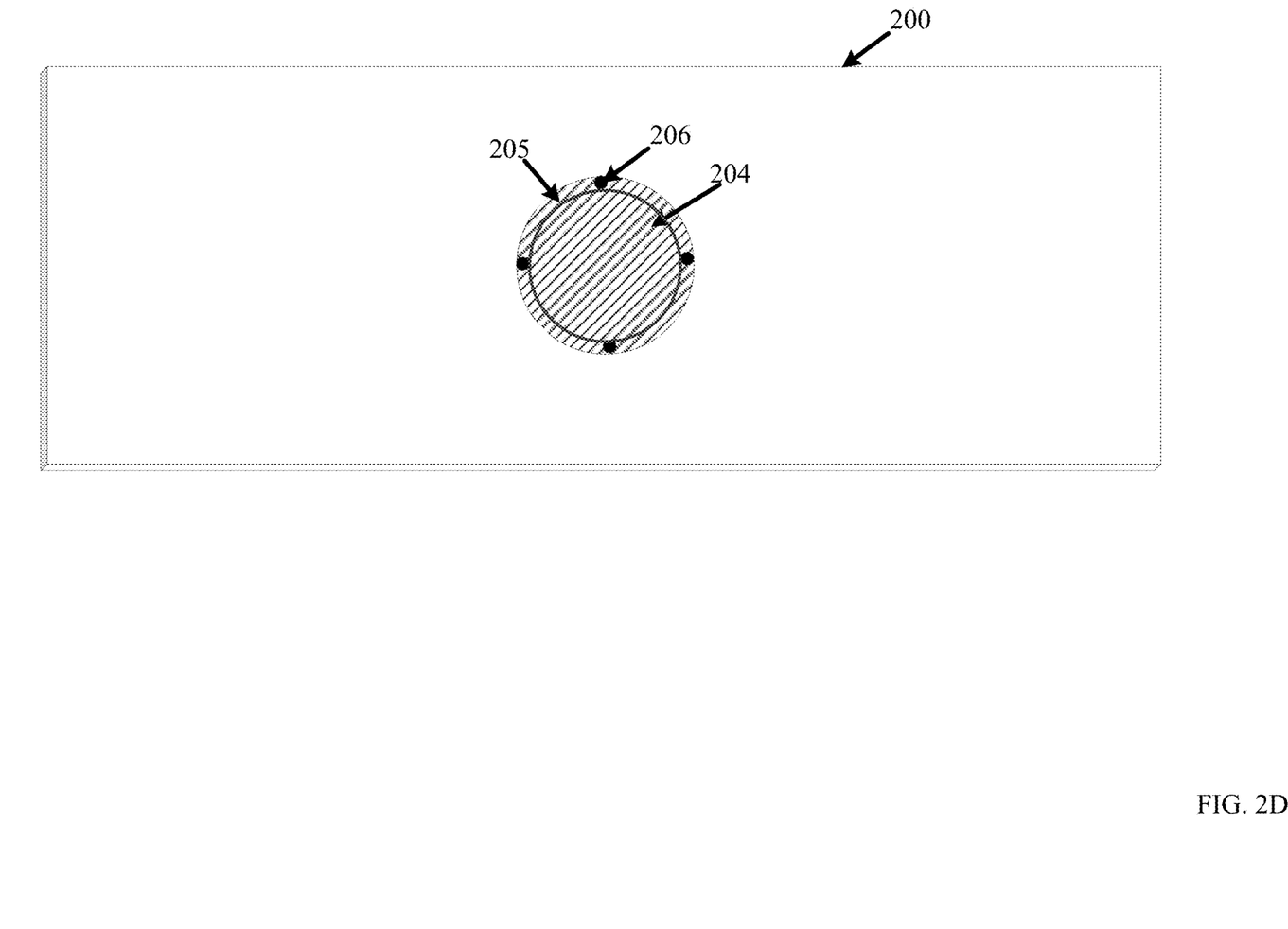
FIG. 2D is a perspective view of a performed convex reflective target fixed onto a panel of the combine grain tank using fasteners, according to an embodiment of the disclosure.
Figure 2E:
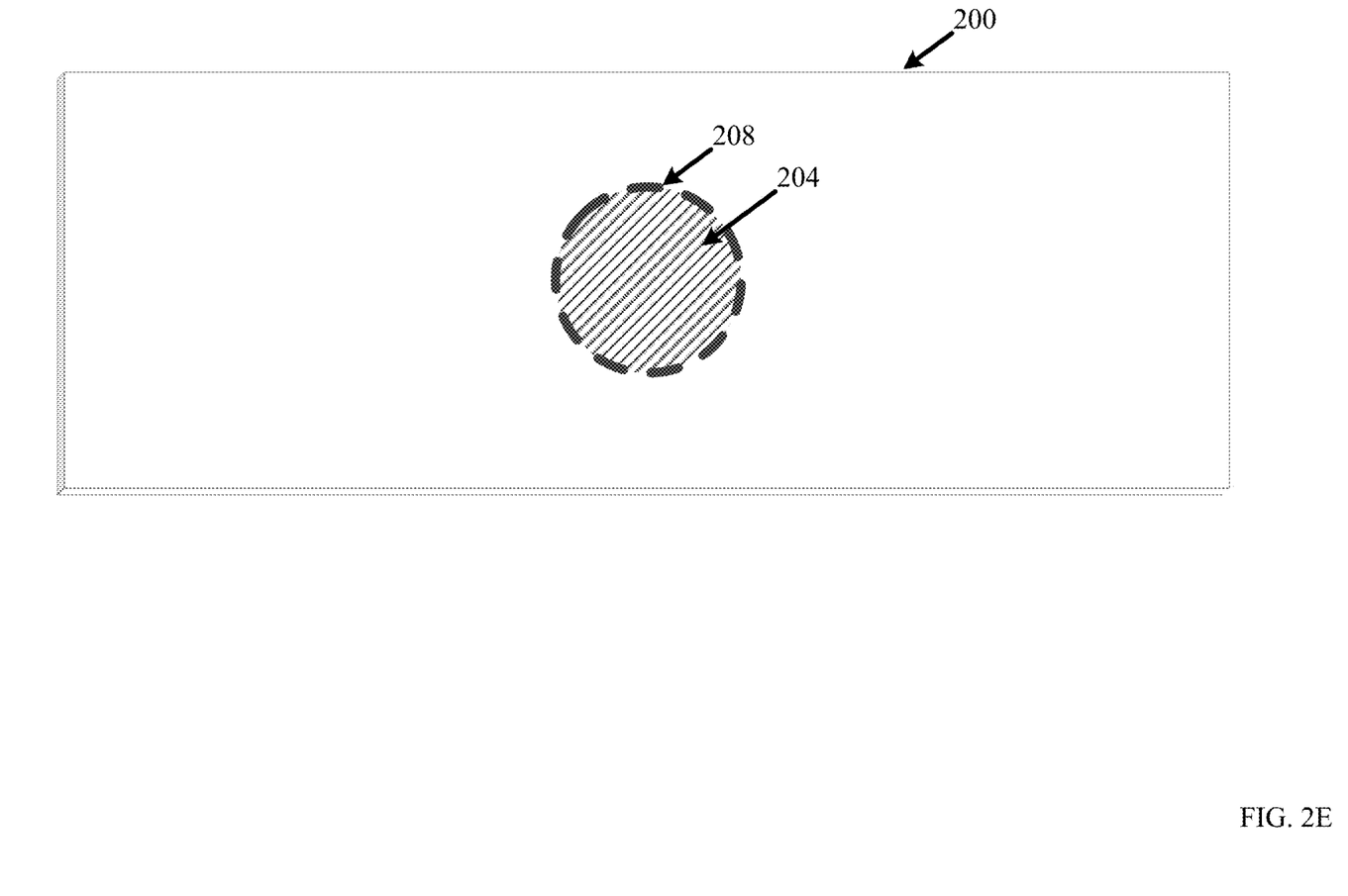
FIG. 2E is a perspective view of a performed convex reflective target welded onto a panel of the combine grain tank, according to an embodiment of the disclosure.

Reflective target(s) 92A/92B should be positioned in the grain tank in manner that does not require adjustment once installed, and is not susceptible to movement (e.g. due to vibration) that could cause misalignment with sensor 90 over time. FIGS. 2C, 2D and 2E show such configurations.

For example, as shown in FIG. 2C, reflective target 202 is positioned on a panel (e.g. floor panel or auger cover) of the combine grain tank 28. In this example, reflective target 202 is not a separate component (e.g. separate piece of metal), but rather a convex portion that is embossed into panel 200 of grain tank 28. For example, during manufacturing, the chosen panel (e.g. floor panel, auger cover or the like) is inserted into a stamping machine having a convex male die and concave female die in the shape of the desired reflective target. When the convex male die and concave female die are mated, the panel is formed to the shape of the desired reflective target. A benefit to this configuration is that reflective target 202 is not a separate component, but rather an integral embossed portion of the panel itself. Since the panel is metal, the embossed portion is therefore reflective and may act as a convex target for sensor 90. In general, reflective target 202 may be embossed into any portion of the panel determined to be in relative alignment with the placement of sensor 90.

In another example, as shown in FIG. 2D, reflective target 204 is also positioned on a panel (e.g. floor panel or auger cover) of the combine grain tank. However, in this example, reflective target 204 is a separate component (e.g. separate piece of metal) from panel 200. For example, a convex target may be manufactured (e.g. stamped and cut from a piece of metal) separate from panel 200. Reflective target 204 may then be fixed (e.g. mounted) to reflective target 204 via fasteners 206 (e.g. screws, bolts, etc.) placed around the perimeter of reflective target 204. A flange 205 around the perimeter of reflective target 204 that is flush with panel 200 may be used for mounting purposes.

In another example, as shown in FIG. 2E, reflective target 204 is also positioned on a panel (e.g. floor panel or auger cover) of the combine grain tank. As was the case in FIG. 2D, reflective target 204 is yet again a separate component (e.g. separate piece of metal) from panel 200. For example, a convex target may be manufactured (e.g. stamped and cut from a piece of metal) separate from panel 200. However, in this example, reflective target 204 may then be fixed (e.g. mounted) to reflective target 204 via a welding bead around the perimeter of reflective target 204.

Although the Examples above describe reflective target 204 as being a piece of metal, it is noted that reflective target 204 can be any material that is reflective. In addition, in the examples of FIGS. 2D and 2E where reflective target 204 is a piece of metal that is separate from panel 200, it is noted that the portion (not shown) of panel 200 located behind reflective target 204 may be cut out of panel 200 to save weight. The cutout portion (not shown) would be similar in shape to reflective target 204 but slightly smaller in size (e.g. smaller diameter) so as to allow for fixing of reflective target 204, and to be completely covered by reflective target 204.

Figure 3:
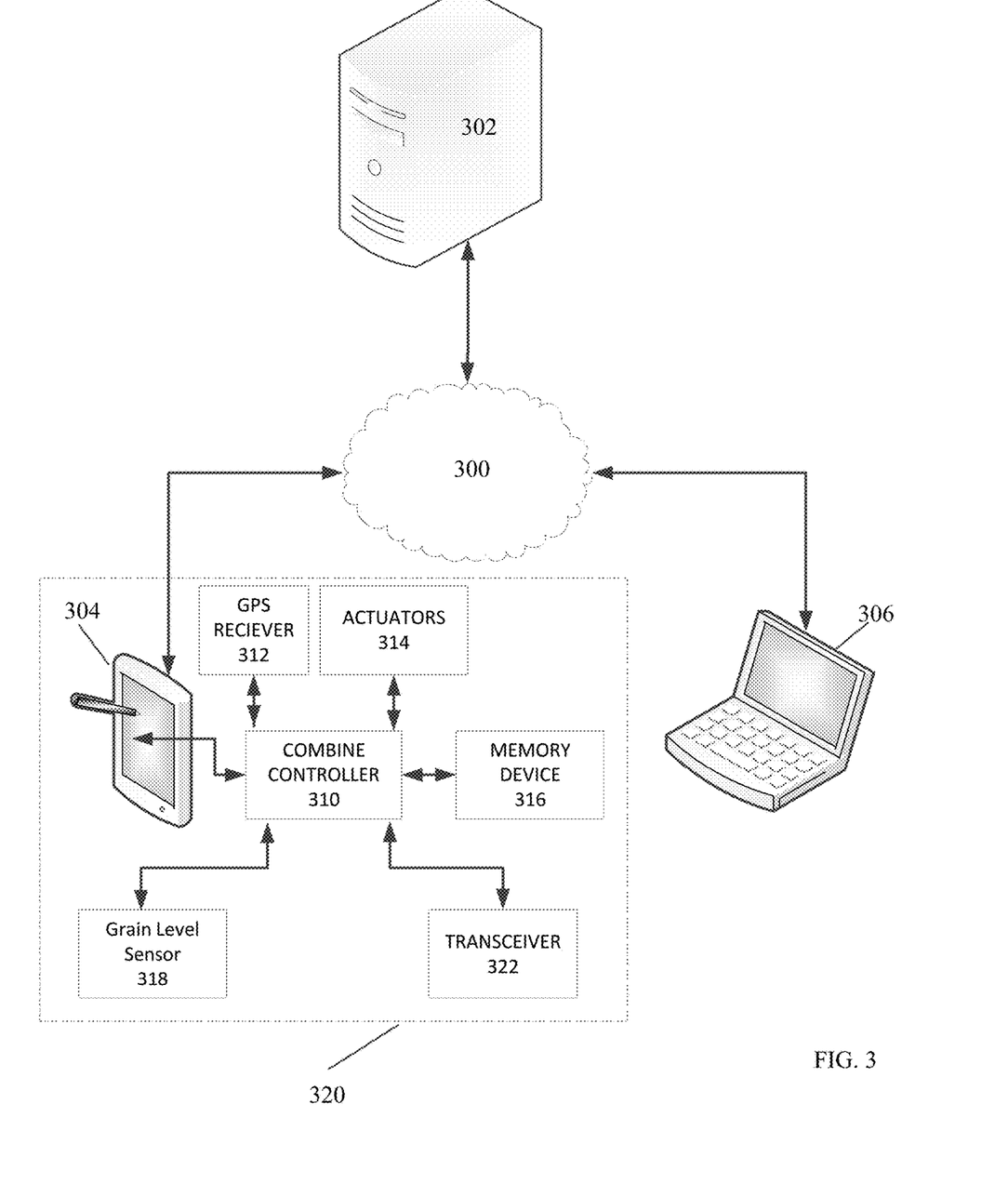
FIG. 3 is a view of the communication between the combine control system and an external network, according to an embodiment of the invention.

FIG. 3 shows an example of a system for controlling the combine. The system includes an interconnection between a control system of combine 10, a remote PC 306 and a remote server 302 through network 300 (e.g. Internet). It should be noted that combine 10 does not have to be connected to other devices through a network. The controller of combine 10 can be a standalone system that receives operating instructions (e.g. tank level instructions such as alert levels, shifted operating ranges, etc.) through a user interface, or through a removable memory device (e.g. Flash Drive).

Controller 310 may be configured to electronically control the operation of one or more components of the combine 10. In general, the controller 310 may comprise any suitable processor-based device known in the art, such as a computing device or any suitable combination of computing devices. Thus, in several embodiments, the controller 310 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 310 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 316 may generally be configured to store suitable computer-readable instructions that, when implemented by the processor(s), configure the controller 310 to perform various computer-implemented functions, such as one or more aspects of the methods described below with reference to FIGS. 4A and 4B. In addition, the controller 310 may also include various other suitable components, such as a communications circuit or module, one or more input/output channels, a data/control bus and/or the like.

Prior to operating combine 10, an operator may designate grain information such as grain tank levels. In one example, the operator uses interface 304 of the combine control system or PC 306 located at remote location 308. Interface 304 and PC 306 allow the operator to view locally stored parameters from memory device 316 and/or download parameters from server 302 through network 300. The operator may select (via Interface 304 or PC 306) appropriate grain loss alert levels based on various factors including, among others, the type of grain to be harvested by the combine, and the terrain. Once the grain loss alert levels are selected, the operator can begin harvesting. Combine controller 310 then controls actuators 314 (e.g. thresher, chopper, etc.) based on the instructions. For example, grain tank level sensor 318 may be used during harvesting to determine grain tank level which is output to the operator. Harvesting may also be tracked and aided by GPS receiver 312.

For example, the combine may be configured to provide a notification of the grain tank level of the harvested grain within the grain tank 28 to the operator of the combine 10. In such embodiment, the controller 310 may be communicatively coupled to the feedback device(s) 304 via a wired or wireless connection to allow feedback signals to be transmitted from the controller 310 to the feedback device(s) 304. In this regard, the feedback device(s) 304 may be configured to provide a visual and/or audible notification of the grain tank level to the operator of the combine 10 based on the feedback signals received from the controller 310.

Figure 4A:
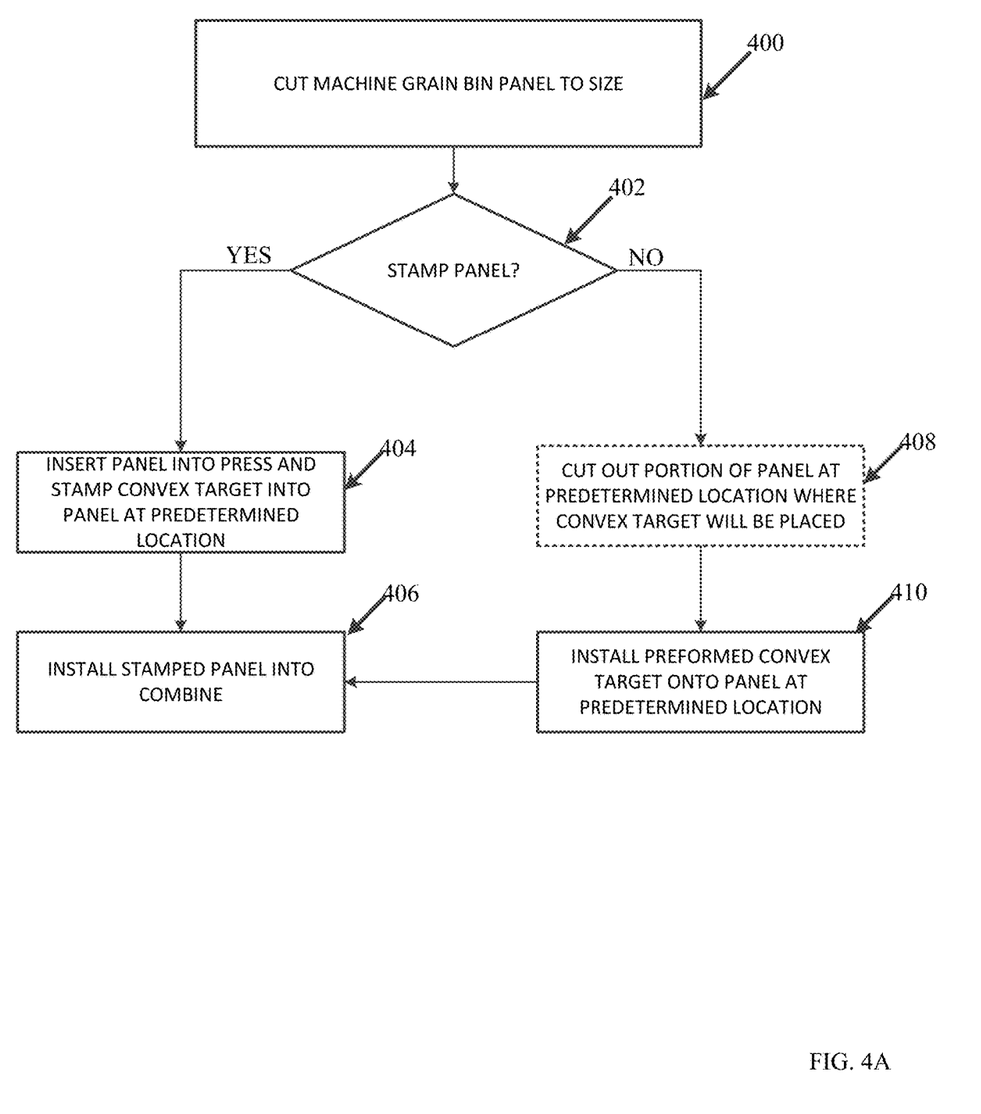
FIG. 4A is a flowchart for installing the convex reflective target on a panel of the combine grain tank, according to an embodiment of the invention.

FIG. 4A is a flowchart for installing a three dimensional (e.g. convex) reflective target on a panel of the combine grain tank. In step 400, the panel (e.g. floor panel, auger cover, etc.) is cut to size according to the grain tank specifications. In step 402, the manufacturer decides on whether to stamp the panel or use another method to install the convex reflective target. If the panel is to be stamped, the panel is inserted into the press in step 404, and the convex reflective target is embossed into the panel at the desired location. Then, in step 406, the stamped panel is installed into the combine as usual when assembling the grain tank. However, if the panel is not to be stamped, an optional step 408 is performed to cut out a portion of the panel at the desired location of the convex reflective target. As mentioned above, the cutout portion should be slightly smaller than the convex reflective target. Then, in step 410, a preformed convex reflective target (e.g. separate piece of metal or other reflective material) is installed on the panel at the desired location (e.g. over the cutout portion if available) using a fixing technique such as welding, gluing, screwing, bolting or the like. Then, in step 406, the stamped panel is installed into the combine as usual when assembling the grain tank.

Figure 4B:
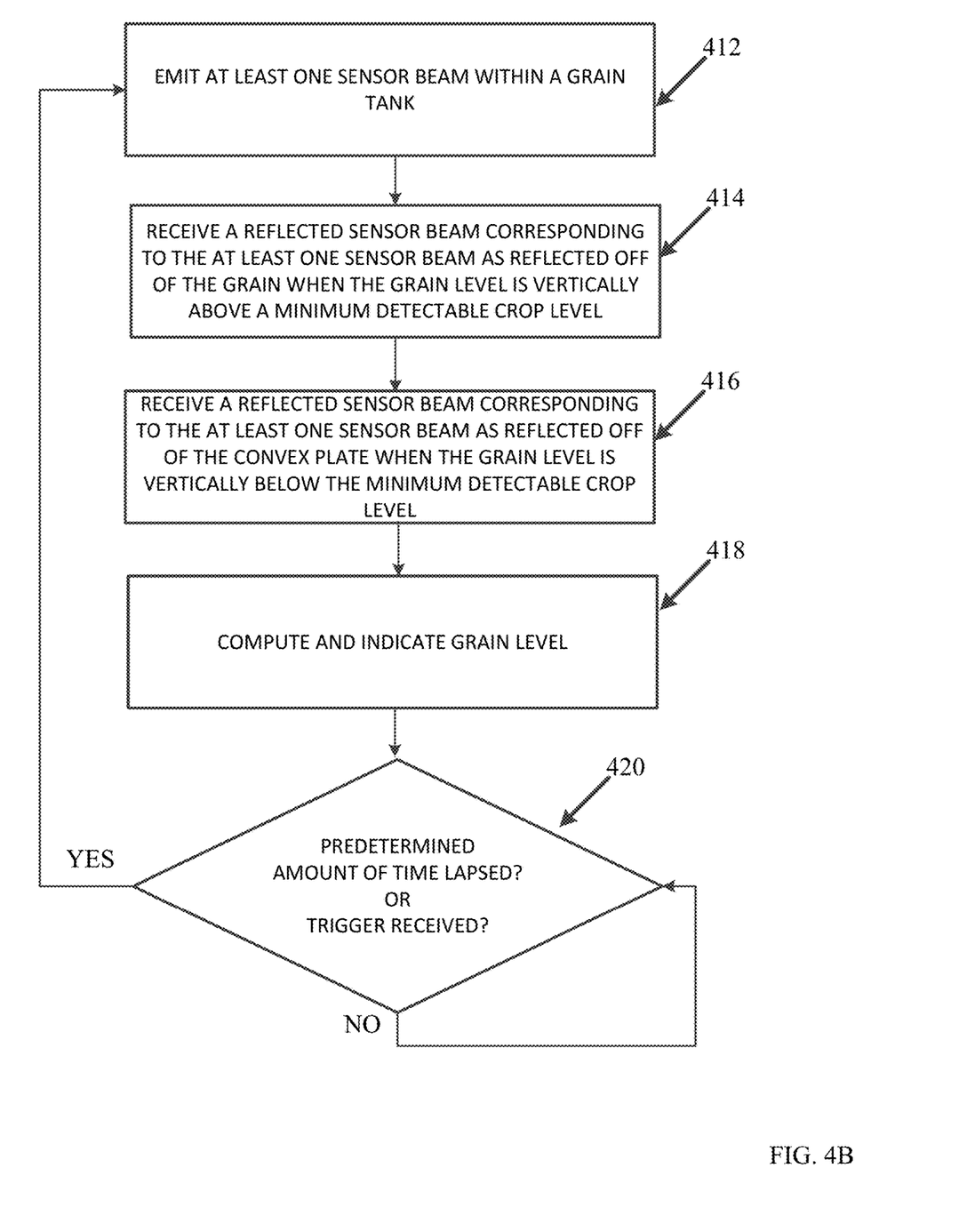
FIG. 4B is a flowchart for detecting grain tank level using the convex reflective target, according to an embodiment of the invention.

FIG. 4B is a flowchart for detecting grain tank level using the convex reflective target. In step 412, sensor 90 emits a beam in the general direction of the convex reflective target in the grain tank. In step 414, when the grain is vertically above the minimum detectable grain level, the beam is reflected from the grain back to sensor 90. The computed grain level in step 418 therefore indicates the actual level of harvested grain in the tank. However, in step 416, when the grain is vertically below the minimum detectable grain level, the beam is reflected from the convex reflective target to sensor 90. The computed grain level in step 418 therefore indicates that the actual level of harvested grain in the tank is below the minimum level and cannot be determined. This measurement process may be repeated when a predetermined amount of time has passed or a trigger is received (e.g. request by the operator) in step 420.

The steps including cutting the panel to size, stamping the panel with the convex target or installing the preformed convex target shown in steps 400-410 of FIG. 4A, are performed by the manufacturer during the manufacturing of the combine, by the customer after manufacturing of the combine or a combination of both. The steps including emitting the beam, receiving the reflected beam and computing the grain level shown in steps 412-420 of FIG. 4B are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in of FIG. 4B, are implemented in software code or instructions which are tangibly stored on a tangible computer readable medium. Upon loading and executing such software code or instructions by the controller 310, the controller 310 may perform any of the functionality of the controller 310 described herein, including the steps shown in of FIG. 4B described herein.

It is to be understood that the operational steps are performed by the controller 310 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 310 described herein is implemented in software code or instructions which are tangibly stored on a tangible computer readable medium. Upon loading and executing such software code or instructions by the controller 310, the controller 310 may perform any of the functionality of the controller 310 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A system for sensing harvested grain levels within an agricultural harvester, the system comprising:
   a grain tank extending vertically between a top end and a bottom end, the grain tank being configured to receive harvested grain, a current grain level of the harvested grain being defined by a top surface of the harvested grain within the grain tank;
   a sensor configured to emit a sensor beam into the grain tank for reflection off of the top surface of the harvested grain; and
   a reflective target stamped, mechanically fixed, fastened or welded to a bottom surface of the grain tank at a minimum detectable grain level within the grain tank, the bottom surface of the grain tank being angled towards the sensor, the minimum detectable grain level being defined by a minimum grain level within the grain tank at which the top surface of the harvested grain is contacted by the sensor beam, and the reflective target being configured to reflect the sensor beam when the current grain level is vertically below the minimum detectable grain level.

2. The system of claim 1, wherein the reflective target has a convex shape.

3. The system of claim 1, wherein the reflective target is stamped into a panel that defines the bottom surface of the grain tank.

4. The system of claim 3, wherein the panel is a floor panel or auger cover in the grain tank.

5. The system of claim 1, wherein the reflective target is welded or fixed with fasteners to a panel that defines the bottom surface of the grain tank.

6. The system of claim 5, wherein a portion of the panel below the reflective target is cutout from the panel, the reflective target covering the cutout.

7. The system of claim 1, wherein the system is part of an agricultural harvester.

8. An agricultural harvester, comprising:
a harvesting implement;
a threshing and separating assembly configured to thresh and separate the harvested grain provided by the harvesting implement;
a grain tank extending vertically between a top end and a bottom end, the grain tank being configured to receive the harvested grain from the threshing and separating assembly;
a sensor configured to emit a sensor beam into the grain tank for reflection off of a top surface of the harvested grain, a current grain level being defined by the top surface of the harvested grain within the grain tank; and
a reflective target stamped, mechanically fixed, fastened or welded to a bottom surface of the grain tank at a minimum detectable grain level within the grain tank, the bottom surface of the grain tank being angled towards the sensor, the minimum detectable grain level being defined by a minimum grain level within the grain tank at which the top surface of the harvested grain is contacted by the sensor beam, and the reflective target being configured to reflect the sensor beam when the current grain level is vertically below the minimum detectable grain level.

9. The agricultural harvester of claim 8, wherein the reflective target has a convex shape.

10. The agricultural harvester of claim 8, wherein the reflective target is stamped into a panel that defines the bottom surface of the grain tank.

11. The agricultural harvester of claim 10, wherein the panel is a floor panel or auger cover in the grain tank.

12. The agricultural harvester of claim 8, wherein the reflective target is welded or fixed with fasteners to a panel that defines the bottom surface of the grain tank.

13. The agricultural harvester of claim 12, wherein a portion of the panel below the reflective target is cutout from the panel, the reflective target covering the cutout.

14. The agricultural harvester of claim 8, wherein the grain tank extends longitudinally between a forward end and an aft end, the forward and aft ends being defined relative a forward direction of travel of the agricultural harvester, the sensor being positioned at or adjacent to the aft end of the grain tank.

15. A method for sensing harvested grain levels within an agricultural harvester having a grain tank extending vertically between a top end and a bottom end, a sensor, and a reflective target stamped, mechanically fixed, fastened or welded to a bottom surface of the grain tank at a minimum detectable grain level within the grain tank, the bottom surface of the grain tank being angled towards the sensor, the method comprising:
emitting, by the sensor, a sensor beam into the grain tank towards the reflective target;
reflecting, by the reflective target, the sensor beam when the current grain level is vertically below the minimum detectable grain level; and
receiving, by the sensor, the reflected sensor beam.

16. The method of claim 15, wherein the reflective target has a convex shape.

17. The method of claim 15, wherein the reflective target is stamped into a panel that defines the bottom surface of the grain tank.

18. The method of claim 17, wherein the panel is a floor panel or auger cover in the grain tank.

19. The method of claim 15, wherein the reflective target is welded or fixed with fasteners to a panel that defines the bottom surface of the grain tank.

20. The method of claim 19, wherein a portion of the panel below the reflective target is cutout from the panel, the reflective target covering the cutout.

* * * * *